United States Patent
Schaefer et al.

(10) Patent No.: US 6,596,251 B2
(45) Date of Patent: Jul. 22, 2003

(54) HYDROGEN CYANIDE SYNTHESIS PROCESS

(75) Inventors: Thomas Schaefer, Buettelborn (DE); Thomas Krauss, Moerstadt (DE)

(73) Assignee: Roehm GmbH & Co. KG, Darmstadt (DE)

( * ) Notice: Subject to any disclaimer, the term of this patent is extended or adjusted under 35 U.S.C. 154(b) by 48 days.

(21) Appl. No.: 09/903,776

(22) Filed: Jul. 13, 2001

(65) Prior Publication Data
US 2002/0048544 A1 Apr. 25, 2002

(30) Foreign Application Priority Data
Jul. 13, 2000 (DE) ............................................ 100 34 193

(51) Int. Cl.$^7$ .................................................. C01C 3/02
(52) U.S. Cl. ...................................................... 423/376
(58) Field of Search .......................................... 423/376

(56) References Cited

U.S. PATENT DOCUMENTS 3,379,500 A    4/1968   Albanese et al. ............ 423/376
5,882,618 A    3/1999   Bhatia et al. ................ 423/376

FOREIGN PATENT DOCUMENTS

GB          1 120 401      7/1968
WO          WO 97/09273    3/1997

*Primary Examiner*—Stanley S. Silverman
*Assistant Examiner*—Maribel Medina
(74) *Attorney, Agent, or Firm*—Oblon, Spivak, McClelland, Maier & Neustadt, P.C.

(57) ABSTRACT

A process for the synthesis of hydrogen cyanide by the Andrussow process by reaction of methane or methane-containing natural gas, ammonia and oxygen or oxygen-enriched air on a catalyst at an elevated temperature, wherein $$\frac{O_2}{O_2 + N_2} = 0.25 - 1.0 \,(\text{vol}/\text{vol}).$$

10 Claims, 2 Drawing Sheets

- ——— (SOLID LINE)           EXPLOSION LIMIT OF $CH_4$
- —·—·— (DASH-DOT LINE)       EXPLOSION LIMIT OF $NH_3$
- ▬▬▬ (BOLD SOLID LINE)       EXPLOSION LIMIT OF $NH_3 + CH_4$ (1:1 MIXTURE)
- — — — (DASHED LINE)         AIR-$CH_4$-$NH_3$ MIXTURES
- •  (DOT)                    OPERATING POINTS

| | |
|---|---|
| ——— (SOLID LINE) | EXPLOSION LIMIT OF $CH_4$ |
| —·—·— (DASH-DOT LINE) | EXPLOSION LIMIT OF $NH_3$ |
| ——— (BOLD SOLID LINE) | EXPLOSION LIMIT OF $NH_3 + CH_4$ (1:1 MIXTURE) |
| — — — (DASHED LINE) | AIR-$CH_4$-$NH_3$ MIXTURES |
| • (DOT) | OPERATING POINTS |

H: HEATER
M: MIXER
*: OPTIONAL PREHEATING OF THE INDIVIDUAL STARTING GASES

HYDROGEN CYANIDE SYNTHESIS PROCESS

BACKGROUND OF THE INVENTION

1. Field of the Invention

The present invention relates to an improvement of the Andrussow method for synthesis of hydrogen cyanide (HCN).

2. Description of the Related Art

The synthesis of hydrogen cyanide by the Andrussow method is described in Ullmann's Encyclopedia of Industrial Chemistry, Volume 8, VCH Verlagsgesellschaft, Weinheim, 1987, pp. 161–162. The educt gas mixture, which comprises methane or a methane-containing natural-gas stream, ammonia and oxygen is passed into a reactor over catalyst gauze and reacted at temperatures of about 1000° C. The necessary oxygen is usually introduced in the form of air. The catalyst gauzes comprise platinum or platinum alloys. The composition of the educt gas mixture corresponds approximately to the stoichiometry of the overall equation of the reaction $$CH_4 + NH_3 + 3/2\, O_2 \rightarrow HCN + 3\, H_2O \qquad dHr = -473.9\ kJ,$$

which takes place exothermically.

The discharged reaction gas contains the product HCN, unreacted $NH_3$ and $CH_4$, as well as important by-products CO, $H_2$, $H_2O$ and $CO_2$, and a large proportion of $N_2$.

The reaction gas is cooled rapidly to about 150 to 200° C. in a waste-heat recovery boiler and then passed through a scrubbing column, in which the unreacted NH3 is removed with dilute sulfuric acid and some of the steam is condensed. Also known is the absorption of $NH_3$ with sodium hydrogen phosphate solution followed by recycling of the ammonia. HCN is absorbed in cold water in a downstream absorption column and then purified to better than 99.5 wt % by mass in a downstream rectification unit. The HCN-containing water present in the column bottoms is cooled and recycled to the HCN absorption column.

A broad spectrum of possible embodiments of the Andrussow method is described in German Patent 549055.

As an example, a catalyst comprising a plurality of fine-mesh gauze pieces of Pt with 10% rhodium disposed in series is used at temperatures of about 980 to 1050° C. The HCN yield is 66.1% based on $NH_3$ used.

A method for maximizing the HCN yield by optimal adjustment of the air/natural gas and air/ammonia ratios is described in U.S. Pat. No. 4,128,622.

In addition to the standard operating procedure with air as the oxygen supply, the use of oxygen-enriched air is described in various documents. Table 1 lists some patents with the operating conditions described therein.

U.S. Pat. No. 5,882,618 describes the synthesis of hydrocyanic acid by the Andrussow method using oxygen-enriched air.

To circumvent the problems that occur under these conditions, such as proximity to the explosion limits of the mixture of $NH_3$, $CH_4$ and oxygen-enriched air, as well as the elevated temperature of the catalyst gauze, which can lead to yield losses and shortened catalyst life, the following measures are proposed:

In a first process step, the system is started up with air as the oxygen source. During this first process step, the catalyst mesh reaches a defined temperature.

In a second process step, oxygen is then metered in and, at the same time, the contents of ammonia and methane are adjusted such that the mixture is situated above the upper explosion limit and the catalyst temperature corresponds to within 50 K of the reference temperature determined in step 1. The temperature of the catalyst gauze is about 1100° C. to 1200° C.

By means of this procedure, safe use of the system is achieved during operation with oxygen-enriched air.

International Patent WO 97/09273 overcomes the disadvantages of high $N_2$ dilution of the reaction gases by the use of preheated, mixtures of methane, ammonia and oxygen-enriched air or pure oxygen which are capable of detonation.

In order to be able to safely handle the mixtures that are capable of detonation, a special reactor is used that prevents detonation of the reaction mixture. The use of this solution in industrial practice necessitates intensive investment for converting existing HCN plants.

TABLE 1

List of various references with operating conditions

| corresponds to | German Patent 1283209, 1968, Società Edison Netherlands Patent 6604519, Belgian Patent 679440 U.S. Pat. No. 3,379,500 (italics) | German Examined Application 1288575, 1968, Società Edison Netherlands Patent 6604697, Belgian Patent 679529 | International Patent WO 97/09273, 1997, ICI special reactor | U.S. Pat. No. 5882618, 1999, Air Liquide |
|---|---|---|---|---|
| Educt gas preheating | — | 200 to 400° C. 300 to 380° C. | 200 to 400° C. further temperature data for individual educt gas streams | |
| Gauze temperature | 1100 to 1200° C. | 1100 to 1200° C. | | 1100 ± 50° C. Ratios reported as relative to the mode of operation with air |
| $(O_2 + N_2)/CH_4$ molar ratio | 6.5 to 1.55 4.55 to 2.80 | 6.0 to 1.6 4.5 to 2.6 | | |
| $(O_2 + N_2)/NH_3$ molar ratio | 6.8 to 2.0 4.8 to 3.65 | 6.0 to 2.0 4.5 to 3.0 | | |
| $CH_4/NH_3$ molar ratio | 1.4 to 1.05 1.3 to 1.1 | 1.3 to 1.0 1.25 to 1.05 | 1.0 to 1.5 | |
| $O_2/(O_2 + N_2)$ molar ratio | 0.245 to 0.4 0.27 to 0.317 | 0.245 to 0.35 0.25 to 0.30 | 0.3 to 1.0 | |

Disadvantages of the Related Art Regarding Operation With Air as the Oxygen Supply If air is used as the oxygen supply in the starting-gas mixture, the HCN concentration in the reaction gas reaches only about 6 to 8 vol %. Because of establishment of equilibrium, the low HCN concentration in the reaction gas leads to a relatively low HCN concentration of 2 to 3 wt % by mass in the aqueous discharge stream from the sump of the HCN absorber column. Thus, high expenditure of energy is necessary for cooling and separating the large mass flow of absorption water. Furthermore, the high inert-gas content necessitates relatively large apparatus volume and substance streams in the working-up part of the process. Because of the dilution with nitrogen, the hydrogen content in the residual-gas stream is lower than 18 vol %. Thus the hydrogen cannot be economically isolated as a valuable product.

Disadvantages of the Related Art With Oxygen Enrichment in the Starting Gas

The known processes with oxygen enrichment of the educt gas (see Table 1) represent an improvement over the cited disadvantages of operating with air, but they also lead to other limitations. Examples are:

1. If the $O_2/NH_3$ or $O_2/CH_4$ educt ratios (vol/vol) of the starting gas are not adapted to the degree of enrichment with oxygen, the $NH_3/CH_4/N_2/O_2$ mixture is not sufficiently far from the upper explosion limit, and safe operation of the reactor is no longer assured. Possible consequences are:

(a) danger of explosion
   (b) danger of deflagration (damage to the catalyst gauze)
   (c) danger of local temperature spikes, which damage the catalyst gauze.

2. The increased oxygen supply to the catalyst leads to increased oxidation of $NH_3$ to $N_2$ and thus to decrease of the HCN yield relative to the feed $NH_3$.

3. In the known processes the degree of enrichment with oxygen is limited to an enrichment of up to about 40% $O_2$ in the oxygen-nitrogen mixture (German Patent 1283209, German Patent 1288575, U.S. Pat. No. 5,882,618).

4. Because of enrichment of the educt gas with oxygen, the catalyst gauze can reach a higher temperature, which leads to faster damage to and deactivation of the catalyst.

5. Possible solutions that counter the existing disadvantages with a specially constructed reactor (International Patent WO 97/09273) require large investments and are not suitable for increasing the performance of existing plants at favorable costs.

BRIEF SUMMARY OF THE INVENTION

One object of the invention was therefore to develop a procedure for performing the Andrussow process for synthesis of hydrogen cyanide with which, by extensive enrichment of the combustion air in existing plants to as much as 100 vol % of oxygen, there are ensured increased HCN productivity (metric tons of HCN per hour), accompanied by higher HCN yield relative to feed $NH_3$ and lower energy consumption per metric ton of HCN as well as long operating life of the catalyst gauze and safe plant operation.

These and other objects are achieved by a process for synthesis of hydrogen cyanide comprising reacting methane or methane-containing natural gas, ammonia and oxygen-enriched air or oxygen on a catalyst at an elevated temperature wherein following conditions is satisfied:

$$\frac{O_2}{O_2 + N_2} = 0.25 - 1.0 \text{ (vol/vol), preferably} > 0.40 - 1.0 (vol/vol)$$

and the reaction is carried out in a conventional Andrussow reactor.

Further advantageous embodiments include controlling the molar ratio of $$\frac{CH_4}{NH_3} = 0.95 - 1.05 \text{ (mol/mol) in the educt gas mixture,}$$

intensively mixing oxygen with air to form oxygen-enriched air before adding to the methane or methane-containing natural gas and ammonia; mixing the methane or methane-containing natural gas and ammonia before being metered into the oxygen-enriched air or oxygen; preheating the educt gas mixture prior to reaction, preferably to at most 200° C., more preferably to at most 150° C.

The disadvantages cited hereinabove of operation with air as the oxidizing agent are avoided by the inventive process. When air is completely replaced by oxygen ($O_2/O_2+N_2$ molar ratio=1.0), the productivity of existing HCN reactors can be increased by as much as 300% compared with operation with air.

By means of the inventive process, it is surprisingly possible, in addition to the increase in productivity, at the same time to improve the yield of hydrogen cyanide relative to the expensive $NH_3$ raw material.

At the same time, a residual gas with low nitrogen content and thus high calorific value is generated.

Likewise a distinct decrease of the energy consumption per metric ton of produced HCN is achieved by the fact that, by virtue of the greater HCN concentration in the reaction gas, less water has to be circulated for absorption of the formed HCN.

Furthermore, catalyst efficiency (HCN production quantity per kg of catalyst over the entire life of the catalyst) comparable with that for operation with air is achieved.

The cited improvements are achieved with a non-ignitable educt gas mixture, and they ensure safe operation of the reactor.

The degree of enrichment with oxygen can be as high as 100% $O_2$ in the oxygen-nitrogen mixture.

BRIEF DESCRIPTION OF THE SEVERAL VIEWS OF THE DRAWINGS

FIG. 1 shows educt gas compositions illustrated in the explosion diagram.

FIG. 2a

FIG. 2a describes the mixing of the gases in the known mode of operation with air as the oxygen carrier.

FIGS. 2b and 2c describe alternative versions in which oxygen is metered into the air stream to produce an oxygen-enriched air stream.

DETAILED DESCRIPTION OF THE INVENTION

The improvements in the process of the synthesis of hydrogen cyanide are set forth in sections 1–6. In the following sections methane is used as the hydrocarbon source. Instead of methane, natural gas may be used in the educt gas. In the present context, natural gas is to be understood as a gas which contains at least 88 vol % of methane and ethane and at most 3 vol % of hydrocarbons with more than 3 carbon atoms.

Section 1:

The air volume flow is mixed with pure oxygen or with a nitrogen-oxygen mixture with approximately 40 vol % and more of oxygen.

The ratio $$\frac{O_2}{O_2 + N_2} = 0.25 - 0.40 \, (vol/vol)$$

is setup, although it can range up to $$\frac{O_2}{O_2 + N_2} = 0.25 - 1.0 \, (vol/vol), \text{ preferably} > 0.40 - 1.0 \, (vol/vol).$$

Section 2:

The $\frac{O_2}{NH_3}$-molar ratio in the educt gas mixture lies in the range of $$\frac{O_2}{NH_3} = 0.7 - 1.25 \, (mol/mol).$$

Figure 1:
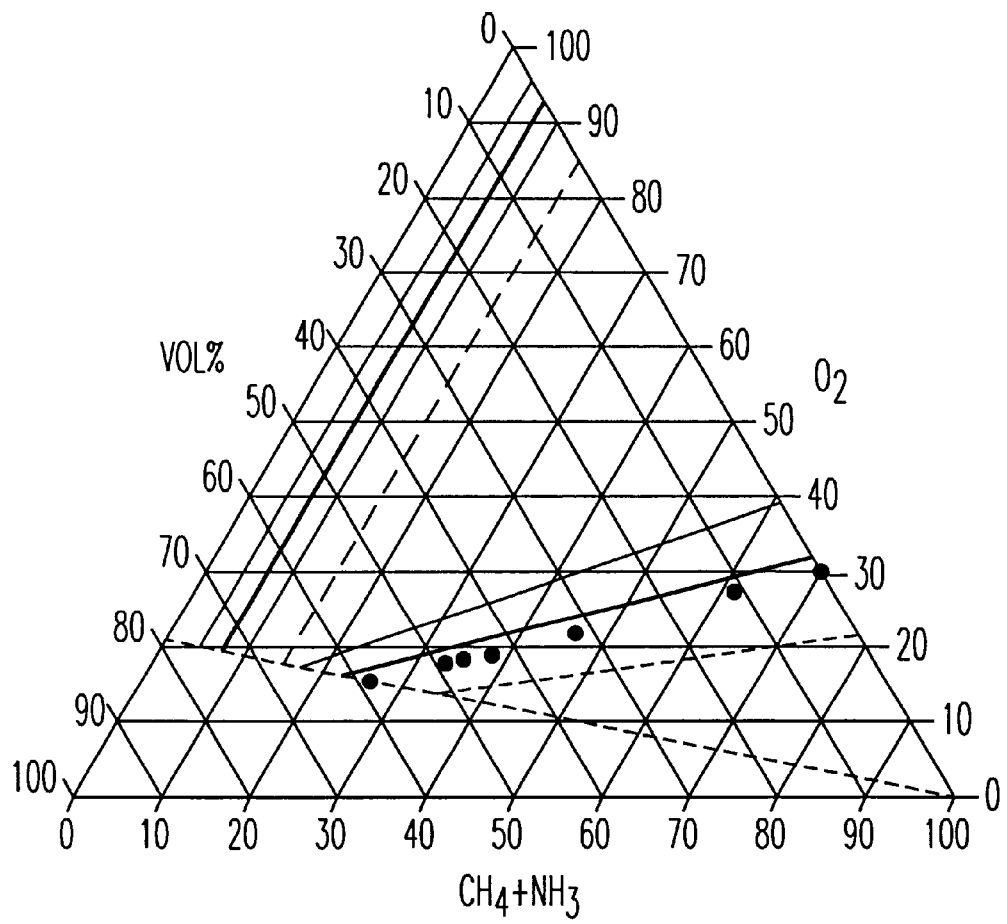
FIG. 1

The $\frac{O_2}{NH_3}$-molar ratio is selected such that the reaction temperature lies between 950° C. and 1200° C., preferably between 1000° C. and 1150° C., and such that the composition of the educt gas mixture lies outside the concentration range of ignitable mixtures. Examples of possible operating points are illustrated in FIG. 1.

The temperature of the catalyst gauze is measured by means of a thermocouple or by means of a radiation pyrometer. As viewed in the flow direction of the gases, the measuring point is disposed downstream from the catalyst gauze, at a distance of about 0 to 10 cm.

Section 3:

Adjustment of the $CH_4/NH_3$ molar ratio in the educt gas mixture in the range of $CH_4/NH_3=0.95$ to 1.05.

Figure 2A:
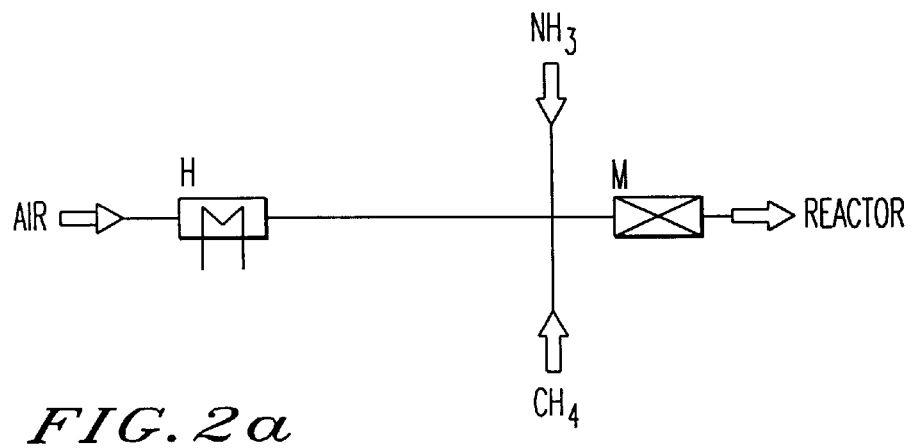
Figure 2B:
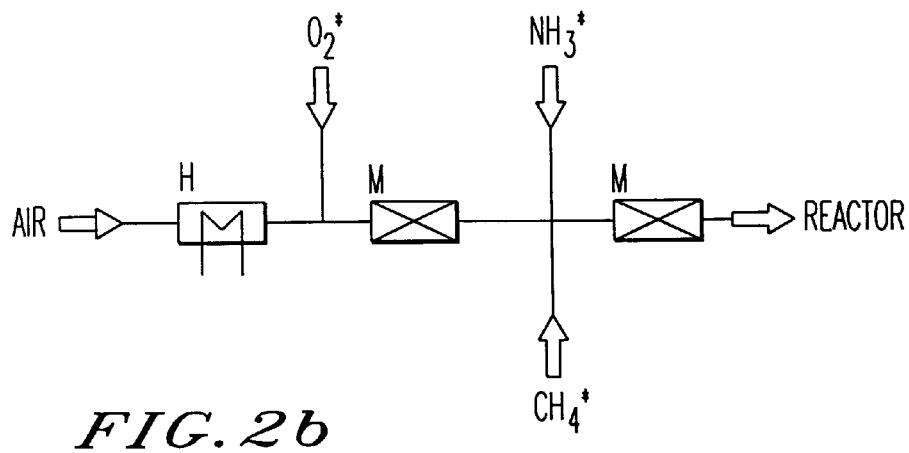
FIGS. 2b and 2c

Section 4:

Intensive mixing of the oxygen stream with the air stream before addition of the $NH_3$ and $CH_4$ combustion gases (see FIG. 2b).

Figure 2C:
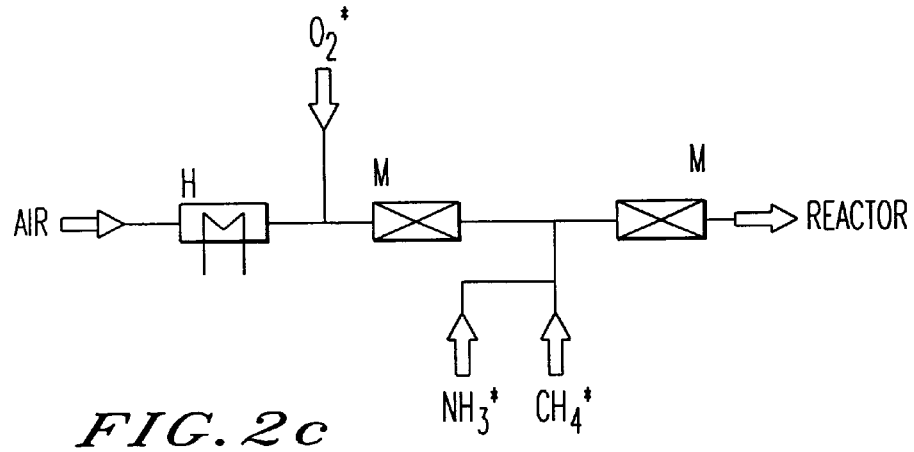

Section 5:

Intensive mixing of the $CH_4$ and $NH_3$ stream with the air-oxygen mixture (see FIG. 2b) or Section 5a:

Mixing of the $CH_4$ and $NH_3$ stream and then subsequent mixing of the combustion-gas mixture into the air-oxygen stream (see FIG. 2c).

Section 6:

Limiting the preheating of the educt gas mixture to at most 200° C., preferably at most 150° C. The temperature of the educt gas mixture can be adjusted by indirectly heating one or more educt gas volume streams (air, $O_2$, $NH_3$, $CH_4$). Partially mixed educt gas volume streams can also be mixed.

EXAMPLES

The examples described hereinafter were performed in a laboratory apparatus comprising a gas metering system with thermal mass throughput regulators for the educt gases used (methane, ammonia, air, oxygen), an electrical heater for preheating the educt gases, a reactor component (inside diameter $d_i$:25 mm) with 6 layers of a Pt/Rh10 catalyst gauze, and a downstream HCN scrubber for neutralization of the formed HCN with NaOH solution.

The reaction gas was analyzed on-line in a gas chromatograph. To determine the balance of the formed HCN quantity, the $CN^-$ concentration in the discharge of the HCN scrubber was additionally determined by argentometric titration.

In one series of experiments, and starting from a mode of operation corresponding to the known operating conditions with air as oxygen source, atmospheric oxygen was progressively replaced by pure oxygen and at the same time the $O_2/NH_3$ molar ratio was reduced while maintaining the $CH_4/NH_3$ ratio constant. All experiments were performed with a constant educt gas volume flow of 24 N 1/min. Table 2 shows a selection of representative results.

TABLE 2

Experimental results of enrichment with $O_2$ in the educt gas ($d_i$: 25 mm, volume flow $V'_F$: 24N 1/min, educt gas temperature $T_F$: 60° C.)

| No. | $O_2$ fraction[1] $V_{O2}/(V_{O2} + V_{N2})$ | Molar ratio $O_2/NH_3$ | Molar ratio $CH_4/NH_3$ | Gauze temp. $T_N$ ° C. | HCN conc. in reaction gas vol % | Specific yield reactor efficiency $L_{spec}$ kg HCN/h/m² | $A_{HCN}$ % |
|---|---|---|---|---|---|---|---|
| 1 | 0.21[2] | 1.15 | 0.98 | 994 | 7.6 | 303 | 62.9 |
| 2 | 0.259 | 1.02 | 0.98 | 1011 | 9.1 | 380 | 62.4 |
| 3 | 0.300 | 0.98 | 0.98 | 1022 | 10.1 | 442 | 64.6 |
| 4 | 0.393 | 0.92 | 0.98 | 1032 | 12.0 | 542 | 65.6 |
| 5 | 0.516 | 0.88 | 0.98 | 1034 | 13.7 | 650 | 66.3 |
| 6 | 0.714 | 0.87 | 0.98 | 1010 | 14.6 | 750 | 66.8 |
| 7 | 1.00[3] | 0.84 | 0.99 | defective | 16.7 | 863 | 68.0 |

[1] $O_2$ fraction in the oxygen-air mixture
[2] only atmospheric oxygen
[3] operation with pure oxygen without air
$L_{spec}$: HCN production quantity in kg/(h*m²) based on the cross-sectional surface area of the catalyst gauze At constant gas volume flow, the specific reactor efficiency increased from about 300 kg HCN/h/m² (oxidizing agent exclusively atmosphere air) to about 860 kg HCN/h/m² during operation with pure oxygen as the oxidizing agent. The HCN yield $A_{HCN,NH3}$ relative to feed ammonia improved from 63% to 68%. The HCN concentration in the reaction gas increased from 7.6 vol % to 16.7 vol % with decrease of the nitrogen content in the educt gas.

German Patent application 100 34 194.2, filed Jul. 13, 2000 is hereby incorporated by reference.

What is claimed is:

1. A process for the synthesis of hydrogen cyanide comprising:

reacting a gas mixture of methane or methane-containing natural gas, ammonia and oxygen-enriched air or oxygen over a catalyst at an elevated temperature in an Andrussow reactor, wherein $$\frac{O_2}{O_2 + N_2} > 0.4 - 1.0 \, (vol/vol).$$

2. The process according to claim 1, wherein the molar ratio of

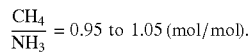

3. The process according to claim 1, wherein oxygen-enriched air is used and is produced by intensively mixing oxygen with air to form said oxygen-enriched air, followed by addition of said methane or methane-containing natural gas and said ammonia.

4. The process according to claim 1, wherein said methane or methane-containing natural-gas and said ammonia are mixed, followed by addition into said oxygen-enriched air or oxygen.

5. The process according to claim 1, wherein said gas mixture is heated prior to reaction.

6. The process according to claim 1, wherein said gas mixture is heated to at most 200° C. prior to reaction.

7. The process according to claim 1, wherein said gas mixture is heated to at most 150° C. prior to reaction.

8. The process according to claim 1, wherein said temperature is from 950° to 1200° C.

9. The process according to claim 1, wherein said temperature is from 1000° to 1150° C.

10. The process according to claim 1, wherein the molar ratio of

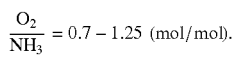

* * * * *